(12) United States Patent
Yu

(10) Patent No.: US 8,528,009 B2
(45) Date of Patent: Sep. 3, 2013

(54) ELECTRONIC DEVICE WITH OPTICAL DISK DRIVE SUPPORT MODULE

(75) Inventor: Ching-Jeng Yu, New Taipei (TW)

(73) Assignee: Wistron Corporation (TW)

( * ) Notice: Subject to any disclaimer, the term of this patent is extended or adjusted under 35 U.S.C. 154(b) by 28 days.

(21) Appl. No.: 13/331,925

(22) Filed: Dec. 20, 2011

(65) Prior Publication Data

US 2012/0233630 A1  Sep. 13, 2012

(30) Foreign Application Priority Data

Mar. 11, 2011  (TW) ............................. 100108330 A

(51) Int. Cl.
  *G11B 33/06* (2006.01)
  *H05K 5/02* (2006.01)
(52) U.S. Cl.
  USPC ..................................... 720/652; 361/679.33
(58) Field of Classification Search
  USPC ................ 720/600, 646, 647, 652–657, 695, 720/703–714; 361/679.33–679.39
  See application file for complete search history.

(56) References Cited

U.S. PATENT DOCUMENTS

| | | | |
|---|---|---|---|
| 7,487,520 B2 * | 2/2009 | Omori et al. .................. | 720/706 |
| 7,663,999 B2 * | 2/2010 | Omori et al. ............... | 369/75.11 |
| 7,802,269 B2 * | 9/2010 | Tsuji ............................. | 720/654 |
| 8,000,097 B2 * | 8/2011 | Yamamoto et al. ...... | 361/679.37 |
| 2006/0285288 A1 * | 12/2006 | Yeh et al. ....................... | 361/685 |
| 2008/0301724 A1 * | 12/2008 | Takasawa ..................... | 720/648 |
| 2009/0165029 A1 * | 6/2009 | Guo ............................. | 720/647 |

* cited by examiner

*Primary Examiner* — Nathan Danielsen
(74) *Attorney, Agent, or Firm* — The Mueller Law Office, P.C.

(57) ABSTRACT

An electronic device includes a housing having top and bottom walls, and an optical disk drive disposed in the housing between the top and bottom walls and including a supporting plate, and a motor shaft disposed at the center of the supporting plate. An optical disk drive support module includes an upper support unit provided on the top wall and having a rotatable element disposed above the motor shaft, a lower support unit provided on the bottom wall below the motor shaft, a bracket connected to the optical disk drive and including top and bottom plates. When the optical disk drive is inserted into the housing, the top plate presses the rotatable element downwardly toward the motor shaft, and the bottom plate pushes the lower support unit upwardly toward the supporting plate. A rolling unit is provided on the top plate, and is in rollable contact with the rotatable element.

10 Claims, 8 Drawing Sheets

ELECTRONIC DEVICE WITH OPTICAL DISK DRIVE SUPPORT MODULE

CROSS-REFERENCE TO RELATED APPLICATION

This application claims priority of Taiwanese Patent Application No. 100108330, filed on Mar. 11, 2011, the disclosure of which is incorporated herein by reference.

BACKGROUND OF THE INVENTION

1. Field of the Invention

This invention relates to an electronic device, and more particularly to an electronic device having an optical disk drive (ODD).

2. Description of the Related Art

FIG. 1 illustrates a fragmentary sectional view of an optical disk drive (ODD) 91 assembled in a housing 92 of a notebook computer. The optical disk drive 91 is disposed between top and bottom walls 921, 922 of the housing 92, and has a supporting plate 912, and a motor shaft 913 disposed at the center of the supporting plate 912. An optical disk 900 is sleeved on the motor shaft 913, and is driven by the motor shaft 913 to rotate therealong. When the optical disk 900 is sleeved on the motor shaft 913, a bottom surface of the optical disk 900 is spaced apart from a top surface of the supporting plate 912.

Referring to FIG. 2, when a region of the top wall 921 of the housing 92, which is above the motor shaft 913, receives a downward force, due to frictional contact between the top wall 921 and the motor shaft, not only is the rotation of the motor shaft 913 adversely affected, but also noise is produced. Further, the downward force also deforms downward a central region of the supporting plate 912, so that the bottom surface of the optical disk 900 is in frictional contact with the top surface of the supporting plate 912.

SUMMARY OF THE INVENTION

Therefore, an object of the present invention is to provide an electronic device with an optical disk drive (ODD) support module. Through the provision of the ODD support module, a fulcrum is formed without affecting rotation of a motor shaft of the optical disk drive, so that frictional contact between an optical disk and the optical disk drive can be prevented and generation of noise can be resolved.

According to this invention, an electronic device with an optical disk drive support module comprises a housing, an optical disk drive, and an optical disk drive support module. The housing has a top wall and a bottom wall. The optical disk drive is disposed in the housing between the top and bottom walls, and includes a supporting plate, and a motor shaft disposed at the center of the supporting plate. The optical disk drive support module includes upper and lower support units, a bracket, and a rolling unit. The upper support unit is provided on the top wall, and includes a rotatable element disposed above and corresponding to the motor shaft. The lower support unit is provided on the bottom wall and is disposed below and corresponds to the motor shaft. The bracket is connected to the optical disk drive, and includes a top plate and a bottom plate. When the optical disk drive is inserted into the housing, the top plate presses the rotatable element downwardly toward the motor shaft, and the bottom plate pushes the lower support unit upwardly toward the supporting plate. The rolling unit is provided on the top plate of the bracket, and is in rollable contact with the rotatable element.

The advantage of the present invention resides in that through the provision of the upper support unit, when the top wall of the housing receives a downward force, a fulcrum is formed without affecting rotation of the motor shaft, so that other portions of the top wall of the housing are prevented from continuously and excessively deforming downward and pressing against the optical disk drive. Further, through the provision of the lower support unit, when the bottom wall of the housing receives an upward force, the lower support unit supports the bottom side of the supporting plate, preventing the supporting plate from deforming and contacting frictionally the optical disk. Simultaneously, friction noise generated by the optical disk drive when pressed can also be resolved.

BRIEF DESCRIPTION OF THE DRAWINGS

Other features and advantages of the present invention will become apparent in the following detailed description of the embodiment of the invention, with reference to the accompanying drawings, in which.

DETAILED DESCRIPTION OF THE PREFERRED EMBODIMENT

Figure 1:
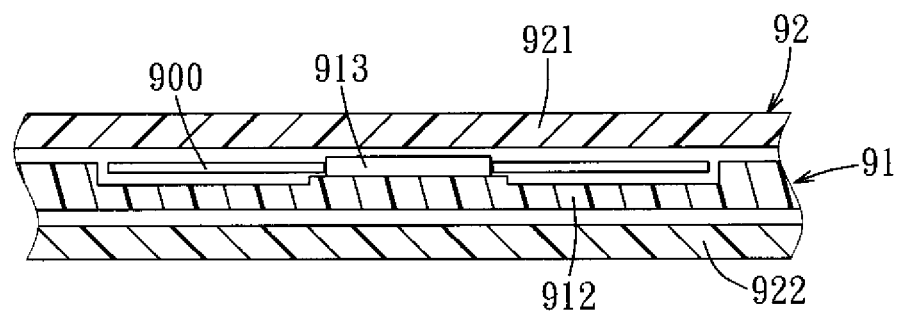
FIG. 1 is a fragmentary sectional view of a housing of a notebook computer incorporating a conventional optical disk drive.
Figure 2:
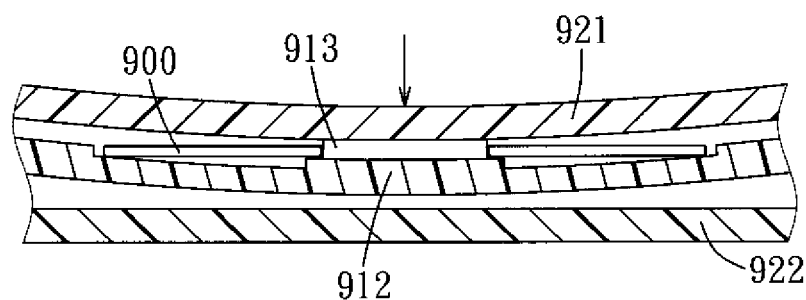
FIG. 2 is a view similar to FIG. 1, but illustrating a supporting plate of the conventional optical disk drive being pressed and deformed.

The above-mentioned and other technical contents, features, and effects of this invention will be clearly presented from the following detailed description of one embodiment in coordination with the reference drawings.

Referring to FIGS. 3 to 7, an electronic device 100 according to the embodiment of this invention comprises a housing 1, an optical disk drive (ODD) 2, and an optical disk drive (ODD) support module 300. In this embodiment, the electronic device 100 is exemplified as a notebook computer, and the housing 1 is a mainframe housing. The electronic device 100 further comprises a screen body (not shown), and electronic components (not shown) disposed inside the housing 1. The housing 1 includes a first top wall 11, and a first bottom wall 12 spaced apart from the first top wall 11. A top side of the first top wall 11 is adapted to be mounted with a keyboard to facilitate user operation of the keyboard. The housing 1 is formed with an access opening 10 to permit entrance of the optical disk drive 2 slidably into the housing 1 along an assembly direction 102, so that the optical diskdrive 2 can be disposed in the housing 1 between the first top wall 11 and the first bottom wall 12.

Figure 3:
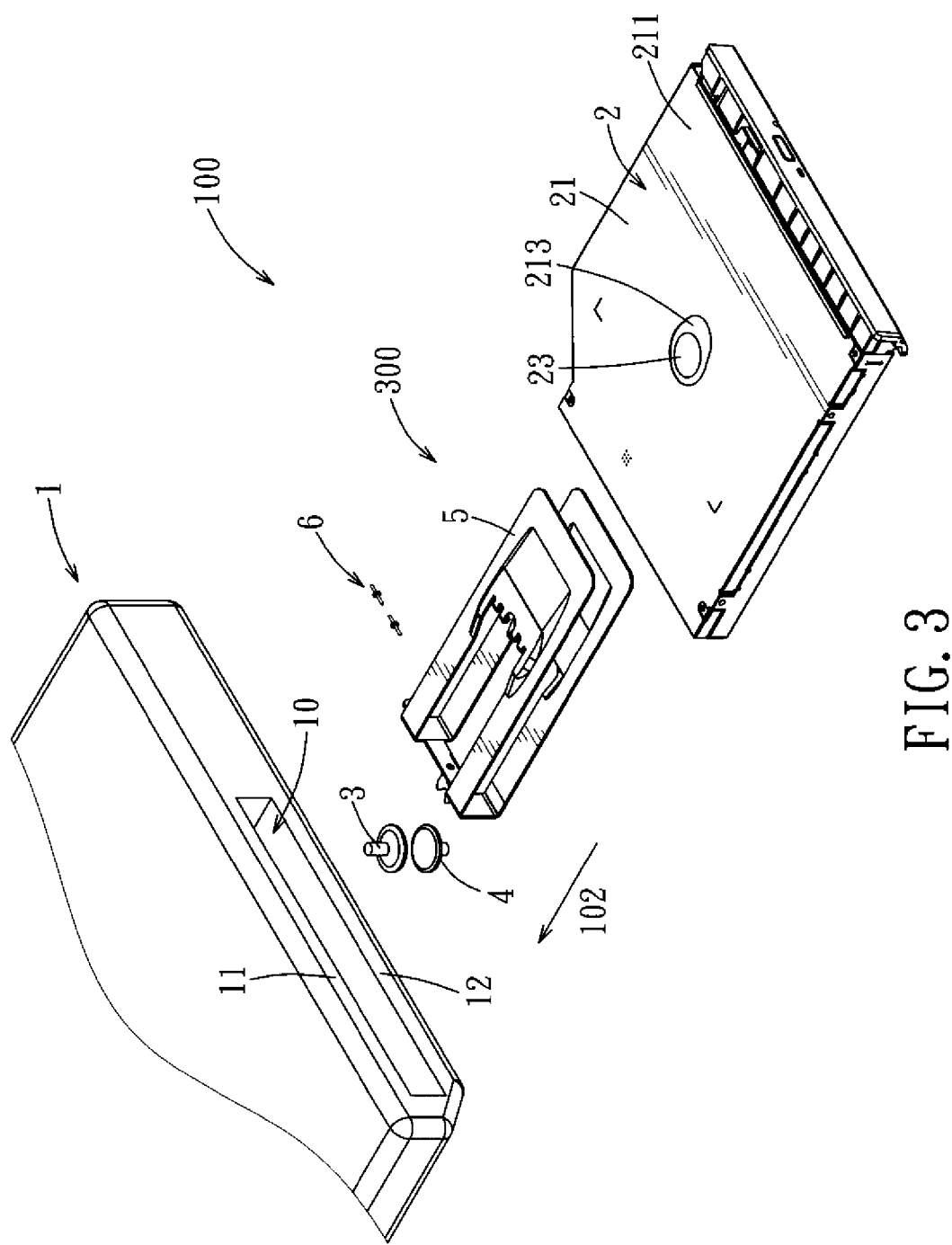
FIG. 3 is a fragmentary exploded perspective view of an electronic device with an optical disk drive support module according to the embodiment of the present invention.
Figure 7:
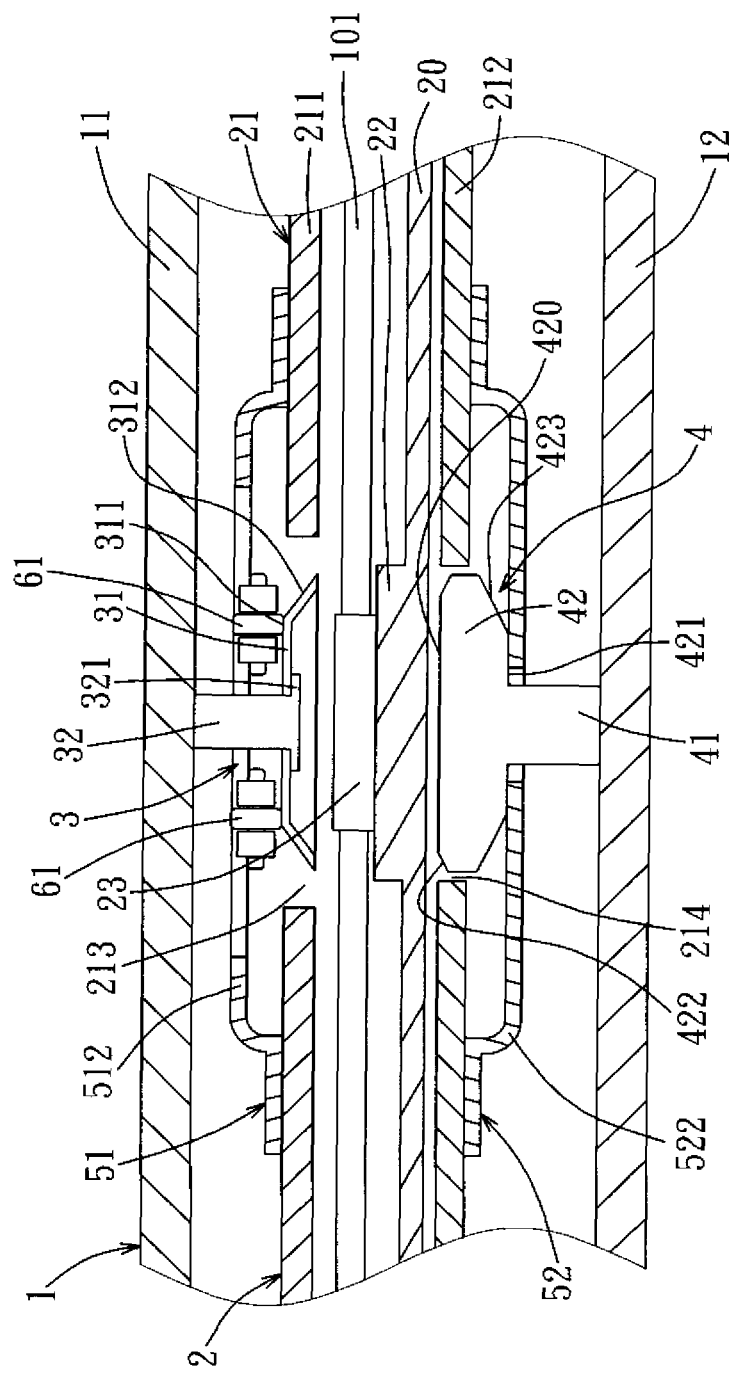
FIG. 7 is a fragmentary enlarged sectional view of this embodiment, illustrating an upper support unit and a lower support unit of the optical disk drive support module being disposed respectively on two opposite sides of a motor shaft of the optical disk drive, and an optical disk being sleeved on the motor shaft.

With reference to FIGS. 3 and 7, the optical disk drive 2 includes a disk drive casing 21, a supporting plate 20 disposed inside the disk drive casing 21, and a motor shaft 23 disposed at the center 22 of the supporting plate 20. The disk drive casing 21 includes a second top wall 211, and a second bottom wall 212 spaced apart from the second top wall 211. The second top wall 211 is formed with a first hole 213 disposed above and corresponding to the motor shaft 23. The second bottom wall 212 is formed with a second hole 214 disposed below and corresponding to the motor shaft 23.

The ODD support module 300 includes an upper support unit 3, a lower support unit 4, a bracket 5, and a rolling unit 6. The upper support unit 3 is provided on the first top wall 11, and includes an upper spindle 32 fixed to an inner surface of the first top wall 11, and a rotatable member 31 sleeved on and rotatable relative to the upper spindle 32. The rotatable member 31 is a rotary disc, and is disposed above and corresponding to the motor shaft 23. Concretely speaking, a bottom end of the upper spindle 32 is formed with an annular flange 321 that extends radially therefrom to support a bottom side of the rotatable member 31. The rotatable member 31 is disposed on the first top wall 11 through the upper spindle 32, and has a top surface 311 facing the first top wall 11, and an annular slanting surface 312 extending downwardly, outwardly, and slantingly from an outer periphery of the top surface 311.

In this embodiment, the lower support unit 4 has a substantially T-shaped cross section, and has a lower spindle 41 fixed to an inner surface of the first bottom wall 12, and a support disc portion 42 connected to a top end of the lower spindle 41. The support disc portion 42 has a disc top surface 420, an annular upper slanting surface 423 extending downwardly, outwardly, and slantingly from an outer periphery of the disc top surface 420, a disc bottom surface 421, and an annular lower slanting surface 423 extending upwardly, outwardly, and slantingly from an outer periphery of the disc bottom surface 421. In other words, the disc top surface 420 and the disc bottom surface 421 have outer peripheries formed with chamfer slopes. The disc top surface 420 faces a bottom side of the supporting plate 20 at a position corresponding to that of the motor shaft 23.

When the optical disk drive 2 is assembled inside the housing 1, the rotatable member 31 of the upper support unit 3 is aligned with the first hole 213 in the second top wall 211, and the support disc portion 42 of the lower support unit 4 is aligned with the second hole 214 in the second bottom wall 212. Further, the upper and lower support units 3, 4 are disposed in the housing 1 at a height such that when the optical disk drive 2 slides into the housing 1 via the access opening 10, the upper and lower support units 3, 4 will not hinder the entrance of the optical disk drive 2 into the housing 1.

Figure 4:
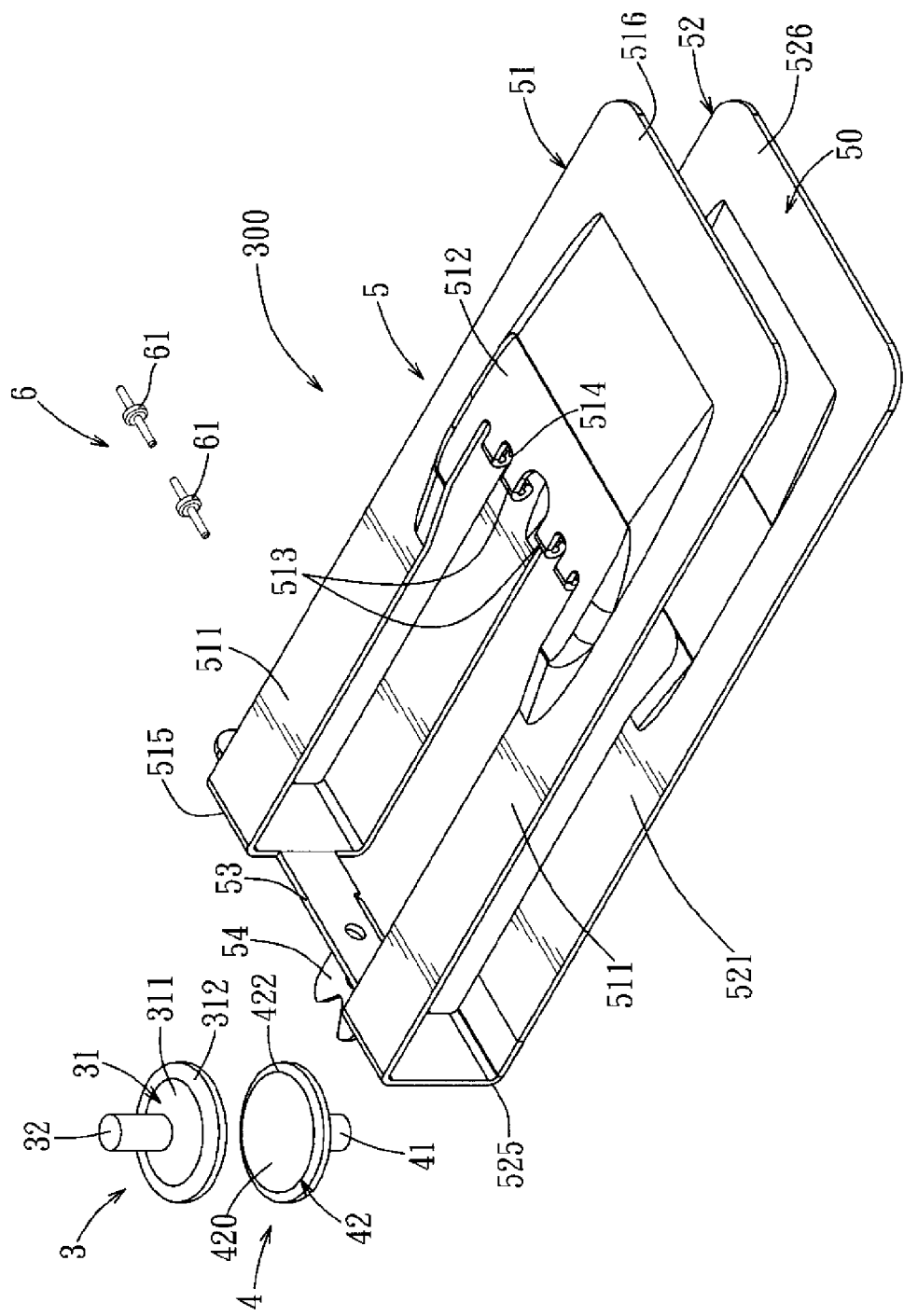
FIG. 4 is an enlarged exploded perspective view of the optical disk drive support module of this embodiment.
Figure 5:
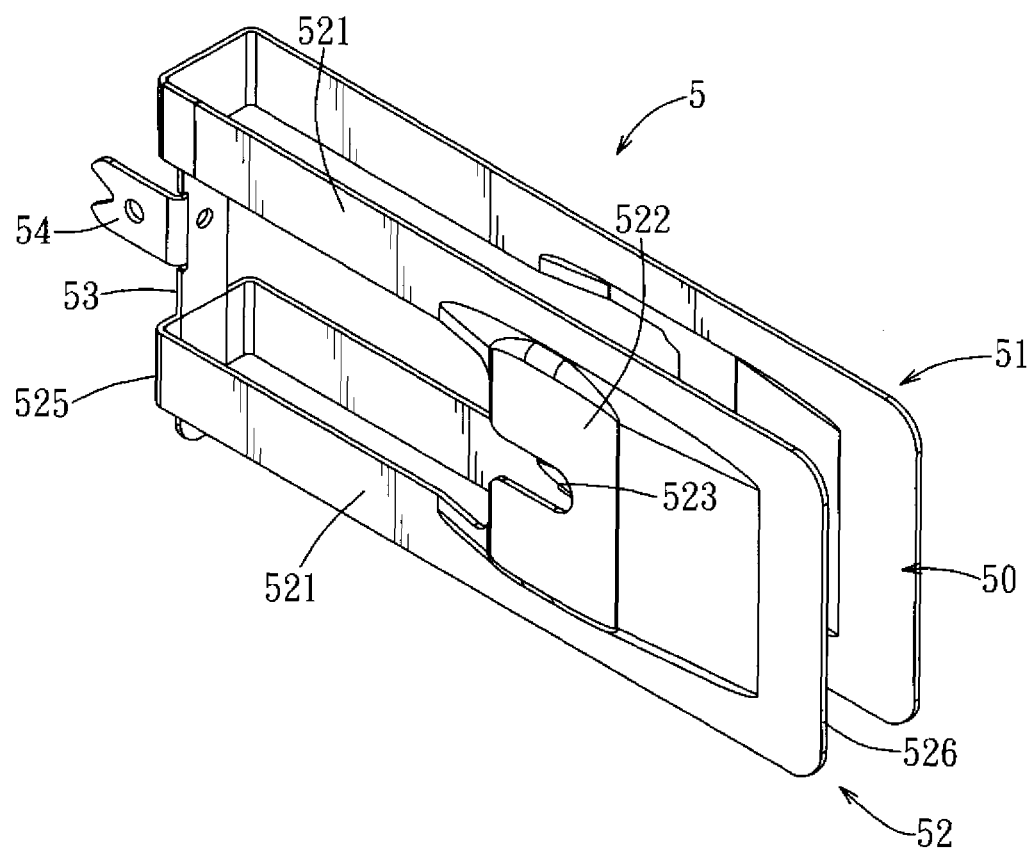
FIG. 5 is an enlarged perspective bottom view of a bracket of the optical disk drive support module.

With reference to FIGS. 4 and 5, in combination with FIG. 3, the bracket 5 has an outer end proximate to the access opening 10, and an inner end distal from the access opening 10. The bracket 5 includes a top plate 51, a bottom plate 52, and a connecting plate 53. In this embodiment, the top plate 51 is U-shaped in a top view, and includes two spaced-apart first plate portions 511 each extending from an inner end 515 to an outer end 516 thereof, a first intermediate plate portion 512 connected between the first plate portions 511 and disposed between the inner and outer ends 515, 516, and a plurality of pivot lugs 513. The first intermediate plate portion 512 arches upwardly so that the first intermediate plate portion 512 is disposed higher than the first plate portions 511.

The bottom plate 52 of the bracket 5 is U-shaped in a top view, and includes two spaced-apart second plate portions 521 each extending from an inner end 525 to an outer end 526 thereof, and a second intermediate plate portion 522 connected between the second plate portions 521 and disposed between the inner and outer ends 525, 526. The second intermediate plate portion 522 is recessed downwardly so that the second intermediate plate portion 522 is disposed lower than the second plate portions 521. The outer ends 516, 526 of the top and bottom plates 51, 52 cooperatively define an opening 50.

The connecting plate 53 interconnects the inner ends of the top and bottom plates 51, 52. That is, the connecting plate 53 interconnects the inner ends 515, 525 of the first and second plate portions 511, 521. The first intermediate plate portion 512 has an edge 514 facing the connecting plate 53. The pivot lugs 513 project inwardly and curl downwardly from the edge 514. The rolling unit 6, in this embodiment, includes a pair of rollers 61 each journalled between a pair of the pivot lugs 513. The second intermediate plate portion 522 has a notched edge 523 facing the connecting plate 53.

Figure 6:
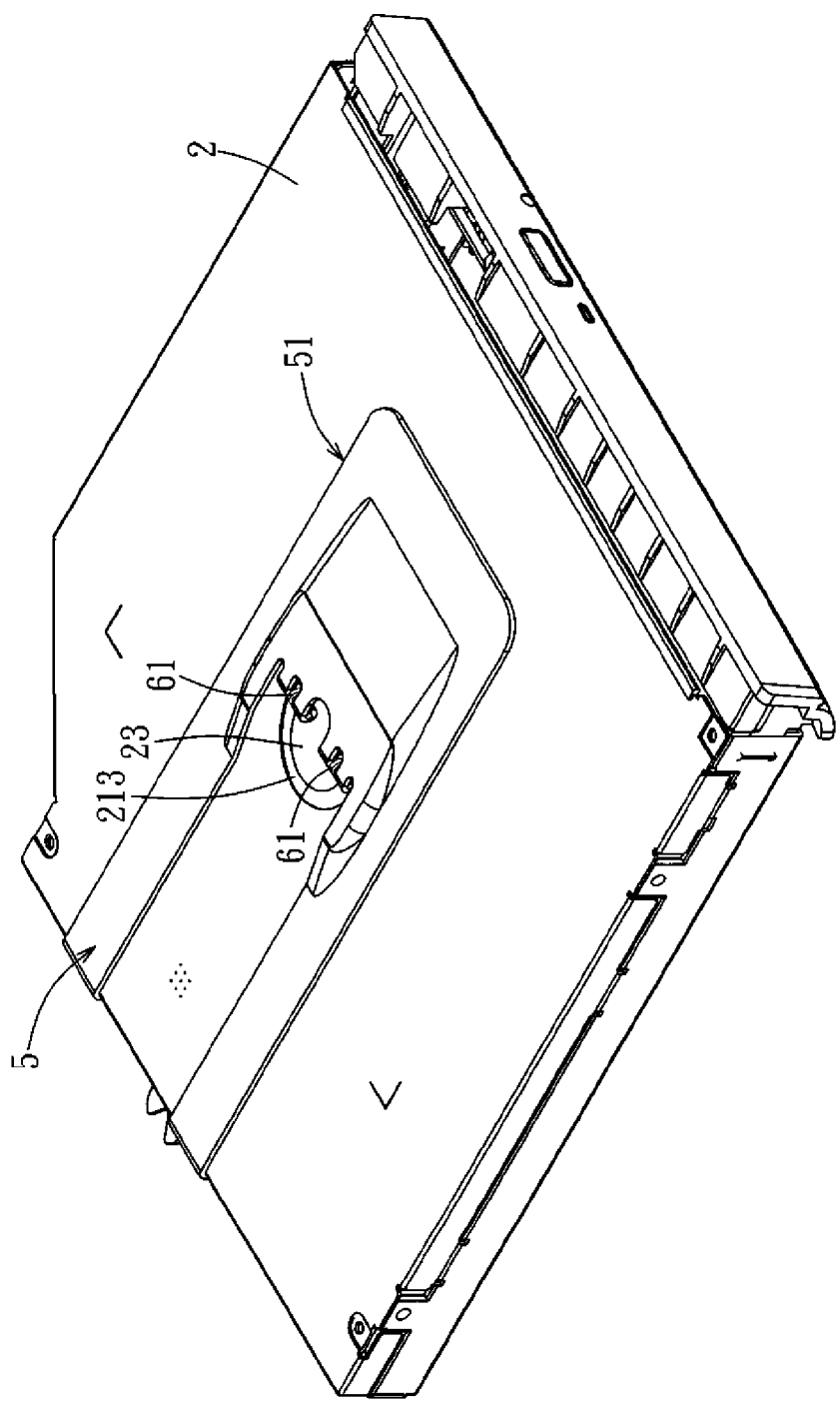
FIG. 6 is an enlarged perspective view of the bracket assembled on an optical disk drive.

With reference to FIGS. 4, 6, and 7, the bracket 5 receives the optical disk drive 2 via the opening 50 so that the optical disk drive 2 is clamped between the top and bottom plates 51, 52. Further, the first intermediate plate portion 512 is spaced apart from and is disposed above the second top wall 211, and the second intermediate plate portion 522 is spaced apart from and is disposed below the second bottom wall 212. The connecting plate 53 is screwed to the optical disk drive 2. The connecting plate 53 may be formed with a protruding piece 54 (see FIGS. 4 and 5) to connect fixedly with the housing 1.

In this embodiment, the bracket 5 is disposed on the optical disk drive 2 such that when the optical disk drive 2 is inserted into the housing 1 via the access opening 10, the first intermediate plate portion 512 of the bracket 5 is disposed between the first top wall 11 and the rotatable member 31, and slightly presses the rotatable member 31 downwardly into the first hole 213 so that the rotatable member 31 is proximate to the motor shaft 23 (for example, a distance of 0.3~0.5 mm from the motor shaft 23). Further, the second intermediate plate portion 522 of the bracket 5 is disposed between the first bottom wall 12 and the support disc portion 42, and slightly pushes the support disc portion 42 upwardly into the second hole 214 so that the support disc portion 12 is proximate to the supporting plate 20 at a position corresponding to a bottom side of the motor shaft 23. In other words, when the optical disk drive 2 is inserted into the housing 1 via the access opening 10 along the assembly direction 102, the bracket 5 will force the upper and lower support units 3, 4 to move toward the optical disk drive 2 so as to shorten a distance between each of the upper and lower support units 3, 4 and the optical disk drive 2.

When the optical disk drive 2 is slid into the housing 1, through the configuration of the slanting surface 312 of the rotatable member 31 and through the provision of the rolling units 6, the rolling units 6 can roll from the slanting surface 312 to the top surface 311 to guide the first intermediate plate portion 512 to move between the rotatable member 31 and the first top wall 11. Further, through the configuration of the lower slanting surface 423 which can guide the second intermediate plate portion 522, the second intermediate plate portion 522 can easily move between the support disc portion 42 and the first bottom wall 12. Moreover, through the provision of the upper slanting surface 422, the optical disk drive 2 is guided to slide into the housing 1 through the upper slanting surface 422 so as to reduce the degree of interference on the optical disk drive 2 by the lower support unit 4.

With reference to FIG. 7, through the provision of the ODD support module 300, when the first top wall 11 of the housing 1 receives a downward pressing force and deforms, the rotatable member 31 of the upper support unit 3 will initially move downward to contact the motor shaft 23 of the optical disk drive 2 and form a fulcrum. When the other regions of the first top wall 11 continuously receive the downward pressing force, they cannot easily press against the optical disk drive 2. Further, since the rotatable member 31 rotates along with the motor shaft 23, and the rollers 61 rotate relative to the rotatable member 31, frictional contact between the top plate 51 of the bracket 5 and the motor shaft 23 can be prevented so as not to affect rotation of the motor shaft 23 and so as to prevent generation of noise.

Additionally, through the provision of the lower support unit 4, when the supporting plate 20 of the optical disk drive 2 receives a downward pressing force and deforms, because the lower support unit 4 supports the supporting plate 20, the supporting plate 20 can be prevented from excessively deforming downward so as to prevent frictional contact between the bottom surface of the optical disk drive 2 and the top surface of the supporting plate 20.

Therefore, from the aforesaid description, it is apparent that because the upper support unit 3 can form a fulcrum without affecting rotation of the motor shaft 23, the other regions of the first top wall 11 of the housing 1 are prevented from continuously pressing against the optical disk drive 2. Further, because of the lower support unit 4, the height of the supporting plate 20 can be maintained, thereby preventing the supporting plate 20 to deform downward and contact frictionally the optical disk 101. Simultaneously, the problem of friction noise generated during pressing of the optical disk drive 2 can be resolved.

Figure 8:
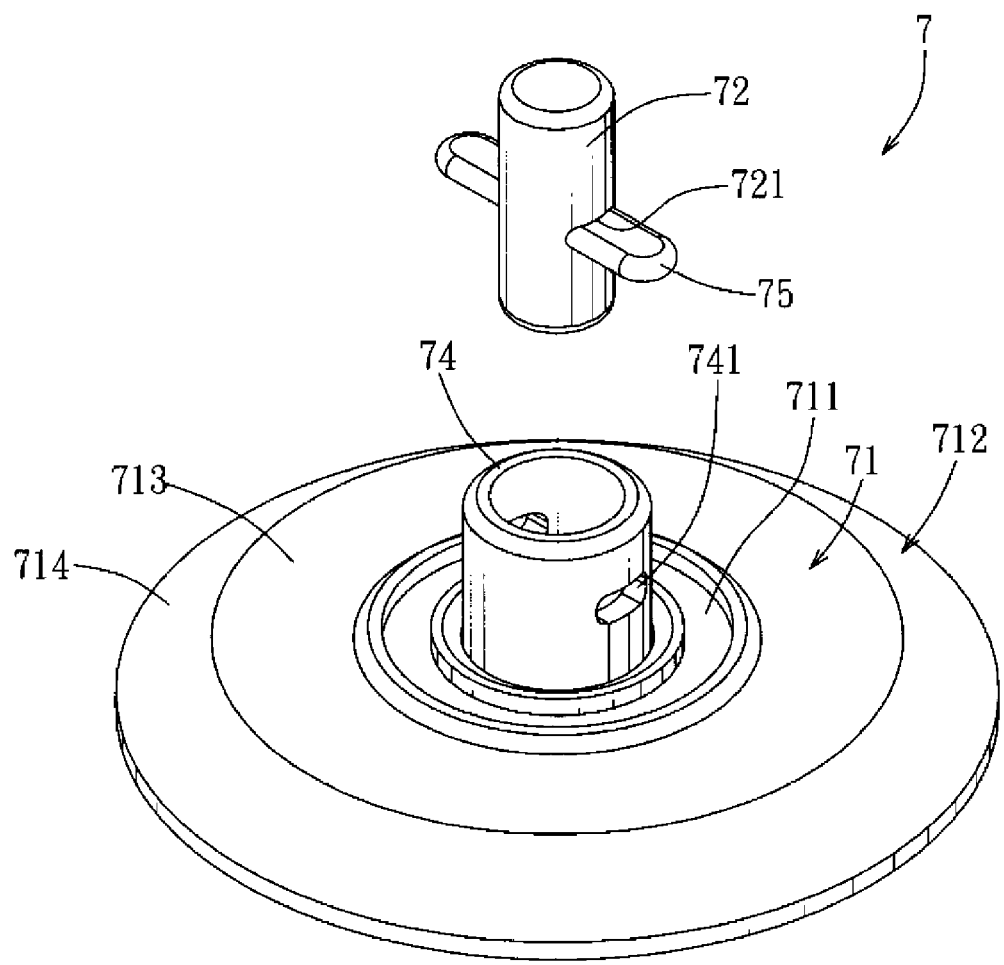
FIG. 8 is an enlarged perspective view of an alternative form of the upper support unit of this embodiment.
Figure 9:
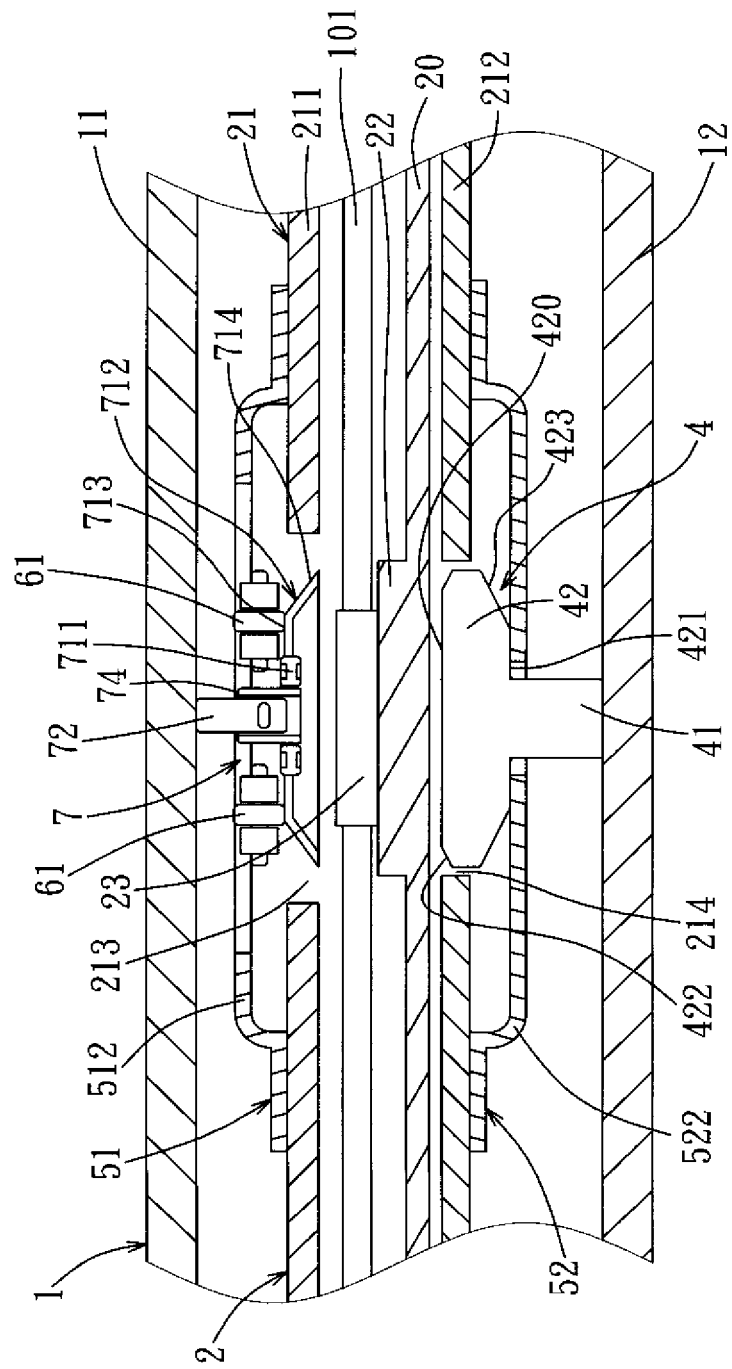
FIG. 9 is a view similar to FIG. 7, but with the upper support unit being substituted by the one shown in FIG. 8.

FIGS. 8 and 9 illustrate an alternative form of an upper support unit 7 of the present invention. The upper support unit 7 includes a rotatable member 71, and an upper spindle 72 to fasten fixedly the rotatable member 71 to the first top wall 11 of the housing 1. The rotatable member 71, in this embodiment, includes a bearing 711, and an outer disc portion 712 connected to and surrounding an outer periphery of the bearing 711. The outer disc portion 712 has a top surface 713, and an annular slanting surface 714 extending downwardly, outwardly, and slantingly from an outer periphery of the top surface 713. For example, the outer disc portion 712 may be plastic connected to the bearing 711 through a double injection process. The upper spindle 72 is formed with two diametrically opposed first positioning holes 721 (only one is visible in FIG. 8). The upper support unit 7 further includes a tubular member 74 and a positioning pin 75. The tubular member 74 is inserted uprightly and fixedly into the bearing 711, and is formed with two diametrically opposed second positioning holes 741. The connection between the rotatable member 71 and the upper spindle 72 is achieved by inserting the upper spindle 72 into the tubular member 74, and then inserting the positioning pin 75 through the second positioning holes 741 in the tubular member 74 and the first positioning holes 721 in the upper spindle 72. As such, the rotatable member 71 can rotate relative to the upper spindle 72. The upper spindle 72 is similarly fixed to the inner surface of the first top wall 11 of the housing 1.

When the optical disk drive 2 is assembled inside the housing 1, the rollers 61 roll on the top surface 713 of the outer disc portion 712, so that when the first top wall 11 is pressed, the bearing 711 as well as the outer disc portion 712 will contact the motor shaft 23 and rotate along with the motor shaft 23. Hence, by using the bearing 711 as a component of the rotatable member 71, the upper support unit 7 can rotate smoothly along with the motor shaft 23.

In summary, through the provision of the ODD support module 300, the present invention not only can resolve the problem of frictional contact between the motor shaft 23 and the housing 1 which results in adversely affecting rotation of the motor shaft 23 and generation of friction noise, but also can resolve the problem of frictional contact between the optical disk drive 2 and the optical disk 101 when the optical disk drive 2 is pressed and deformed. Therefore, the object of the present invention can be realized.

While the present invention has been described in connection with what is considered the most practical and embodiment, it is understood that this invention is not limited to the disclosed embodiment but is intended to cover various arrangements included within the spirit and scope of the broadest interpretations and equivalent arrangements.

What is claimed is:

1. An electronic device, comprising:
a housing having a top wall and a bottom wall;
an optical disk drive disposed in said housing between said top and bottom walls, and including a supporting plate, and a motor shaft disposed at the center of said supporting plate; and
an optical disk drive support module including
an upper support unit provided on said top wall and including a rotatable element disposed above and corresponding to said motor shaft;
a lower support unit provided on said bottom wall and disposed below and corresponding to said motor shaft;
a bracket connected to said optical disk drive and including a top plate and a bottom plate, wherein, when said optical disk drive is inserted into said housing, said top plate presses said rotatable element downwardly toward said motor shaft, and said bottom plate pushes said lower support unit upwardly toward said supporting plate; and
a rolling unit provided on said top plate of said bracket and in rollable contact with said rotatable element.

2. The electronic device as claimed in claim 1, wherein said upper support unit further includes an upper spindle fixed to said top wall, said rotatable element being sleeved rotatably on said upper spindle.

3. The electronic device as claimed in claim 2, wherein said rotatable element is of disc shape, and has a top surface, and an annular slanting surface extending downwardly, outwardly, and slantingly from an outer periphery of said top surface.

4. The electronic device as claimed in claim 3, wherein said top plate of said bracket is U-shaped in a top view, and includes two spaced-apart first plate portions, a first intermediate plate portion connected between said first plate portions and having an edge, and a plurality of pivot lugs extending inwardly from said edge, said rolling unit including a pair of rollers each journalled between a pair of said pivot lugs, wherein, when said optical disk drive is inserted into said housing, said first intermediate plate portion is disposed between said first top plate and said rotatable element, and said rollers contact rollably said top surface of said rotatable element.

5. The electronic device as claimed in claim 4, wherein said bottom plate of said bracket is U-shaped in a top view, and includes two spaced-apart second plate portions, and a second intermediate plate portion connected between said second plate portions, wherein, when said optical disk drive is inserted into said housing, said second intermediate plate portion is disposed between said bottom wall and said lower support unit.

6. The electronic device as claimed in claim 2, wherein said rotatable element includes a bearing, and an outer disc portion connected to and surrounding an outer periphery of said bearing, said outer disc portion having a top surface, and an annular slanting surface extending downwardly, outwardly, and slantingly from an outer periphery of said top surface of said outer disc portion.

7. The electronic device of claim 6, wherein said upper support unit further includes a tubular member and a positioning pin, said upper spindle being formed with two diametrically opposed first positioning holes, said tubular member being fixed to said bearing and being formed with two diametrically opposed second positioning holes, said upper spindle being inserted into said tubular member and being connected to said rotatable element by inserting said positioning pin into said first and second positioning holes.

8. The electronic device as claimed in claim 1, wherein said lower support unit includes a lower spindle fixed to said bottom wall, and a support disc portion connected to said lower spindle and facing said supporting plate of said optical disk drive.

9. The electronic device as claimed in claim 8, wherein said support disc portion has a disc bottom surface, and an annular lower slanting surface extending upwardly, outwardly, and slantingly from an outer periphery of said disc bottom surface.

10. The electronic device as claimed in claim 9, wherein said support disc portion has a disc top surface, and an annular upper slanting surface extending downwardly, outwardly, and slantingly from an outer periphery of said disc top surface.

* * * * *